UNITED STATES PATENT OFFICE.

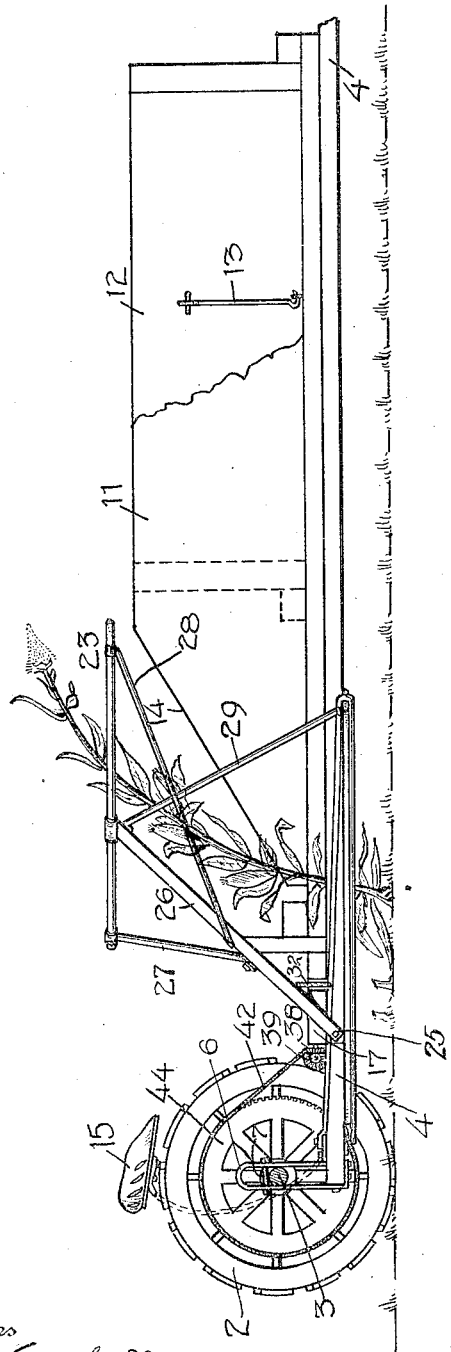

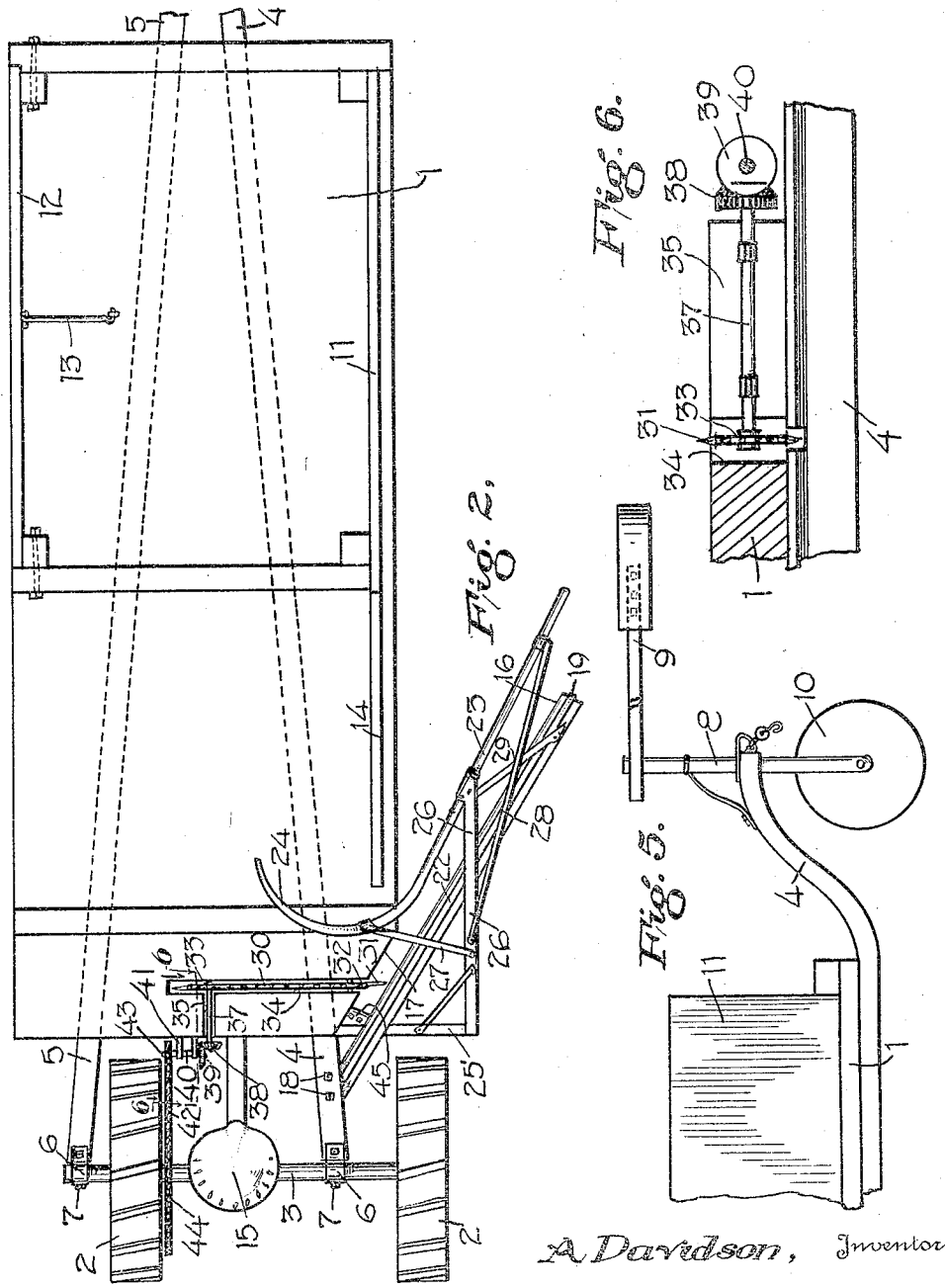

ALFRED DAVIDSON, OF NEW FLORENCE, MISSOURI.

CORN-HARVESTER.

1,115,288.  Specification of Letters Patent.  Patented Oct. 27, 1914.

Application filed February 24, 1914. Serial No. 820,582.

*To all whom it may concern:*

Be it known that I, ALFRED DAVIDSON, a citizen of the United States, residing at New Florence, in the county of Montgomery and State of Missouri, have invented certain new and useful Improvements in Corn-Harvesters; and I do hereby declare the following to be a full, clear, and exact description of the invention, such as will enable others skilled in the art to which it appertains to make and use the same.

My invention relates to new and useful improvements in machines for harvesting corn, involving simple and reliable cutting means for severing the stalks, a wagon frame of a novel construction that is simple and capable of being cheaply constructed, and novel means for preventing the cut corn from interfering with further cutting of the cutting means and for disposing the cut corn in a position spaced from the cutting means, that is carried upon the wagon frame and operatively connected with one of the supporting wheels for the frame.

An important object of my invention resides in the provision of a novel form of cutting apparatus that is arranged in a novel manner upon the wagon frame or body so that an efficient cutting action is provided and the cut corn falls upon the wagon body or frame.

Another important object of the invention resides in the provision of means for guiding the corn and bending it so that the cutting action is had in an expeditious manner, that is carried by the wagon body or frame in superposed relation forwardly of the cutting apparatus, said means further serving to dispose the cut corn in a desirable position upon the wagon body.

A further object of my invention is to provide a corn harvester embodying a wagon frame or body which is long and narrow to enable the cutting between rows, and which is provided with novel means disposed adjacent the cutting apparatus for disposing the cut corn in a position so that it does not interfere with further cutting action of the cutting apparatus, and is in a desirable position upon the wagon frame, said means being operated by suitable gearing that is connected with one of the wheels of the wagon frame, and consisting of a sprocket chain having a plurality of hook members thereon.

Another important object of my invention is to provide a corn harvester of the character described which comprises a vehicle frame having a vertically adjustable rear axle thereon so that the cutting elements of the device may be raised or lowered with relation to the ground.

A still further object of the invention is to provide a corn harvester of the character described which is light, strong and durable, simple as to construction and arrangement, and which may be cheaply constructed.

The above and additional objects are accomplished by such means as are illustrated in the accompanying drawings described in the following specification and then more particularly pointed out in the claims which are appended hereto and form a part of this application.

With reference to the drawings, wherein I have illustrated the preferred embodiment of my invention as it is reduced to practice, and throughout the several views of which similar reference numerals designate corresponding parts: Figure 1 is a side elevation of the device as it would appear when in assembled operative position with one of the ground wheels cut away, Fig. 2 is a top plan view, Fig. 3 is a rear end elevation, Fig. 4 is a front end elevation, Fig. 5 is a fragmentary side elevation of the forward part of the wagon body showing the guide roller and draft gear attached to the frame, and Fig. 6 is a longitudinal sectional view taken on line 6—6 of Fig. 2 illustrating the gearing for operating the means for preventing the cut corn from interfering with the cutting apparatus and disposing the corn in a desirable position upon the wagon body.

Referring to the drawings by characters of reference the numeral 1 designates as an entirety, an approximately rectangular wagon platform being supported at its rear end by traction wheels 2 that are mounted upon a suitably arranged axle 3. Mounted longitudinally of the platform 1 are longitudinal supporting bars 4 and 5 that are secured upon the under face of the platform 1 and converge toward the forward portion of the platform. The rear end of the bars 4 and 5 extend considerably beyond the rear edge of the platform 1 and each carries at its rear end a U-shaped bearing 6. The axle 3 is vertically adjustably mounted in these bearings 6 which are carried in a vertical plane upon the ends of the bars 4 and 5. Suitable clamping means 7 serve to hold the axle in adjusted position. It will thus be seen that the platform may be raised or lowered with relation to the ground by the adjustment of the rear axle 3 as described. This enables the cutting of the corn at the desired point after a manner which will be later described.

The forward ends of the bars 4 and 5 are upwardly inclined and converge and have loosely mounted thereon in any suitable manner a vertical shaft 8 having a suitable draft gear 9 attached to its upper end and a guide roller 10 to engage the ground secured to its lower end. The platform is provided with a pair of vertical side walls 11 and 12 respectively. The side wall 12 is hingedly secured to the platform 1 and is adapted to be held in vertical operative position by means of a hook and eye latch designated 13 as an entirety, the working parts of which are carried upon the platform 1 and wall 12 respectively. This wall 12 is equal to approximately half the length of the platform and disposed upon the opposite side to that upon which the cutting apparatus to be later described, is secured.

The wall 11 is fixed in an upright position in any suitable manner upon the platform 1 and is slightly longer than the wall 12. The rear end of the wall 11 is downwardly inclined as at 14 and the inclined portion is disposed adjacent the cutting apparatus so that the corn when cut will fall upon the platform 1 and cover the inclined portion 14 of the wall 11. The arrangement of the walls 11 and 12 forms a compartment in which the cut corn is adapted to be evenly stacked, and when sufficient corn is disposed within the compartment the hinged wall 12 is let down to an extended horizontal position so that the shock may be disposed upon the ground. A suitable driver's seat 15 is secured adjacent the rear end of the platform 1.

The actual construction of the wagon body having been described, it now remains to take up the description of the cutting apparatus. The cutting apparatus consists of an approximately rectangular cutter blade 16 that is disposed at an angle of approximately 45 degrees relative to the longitudinal axis of the wagon body and extends beyond the edge of the body upon the side adjacent the wall 11. The platform 1 is cut away as at 17 on its rear edge and upon one side thereof. The inclined edge of the platform caused by the cutting away thereof is disposed parallel and in spaced relation to the cutting edge of the blade and serves as a guide for the stalks during the cutting operation. The cutter blade 16 is secured at its inner end to the under side of the bar 4 by suitable fastening means 18.

As a means for bracing the cutter blade 16 so that its proper cutting action is insured, there has been provided a supporting brace 19 formed of a single piece of suitable metal bent substantially intermediate its ends and having its terminal ends secured to the bar 4 in any suitable manner. The outer extremity of the brace 19 is secured to the cutter blade 16 and holds the blade against augmented vibratory movement during the cutting operation thereof. Mounted forwardly of the cutter blade 16 in superposed relation thereto is a guide rod designated 23 as an entirety. The body portion of this guide rod is disposed forwardly at an angle to the platform in approximately the same plane as the cutter blade 16 and is adapted to engage the corn stalks in advance of the blade 16 so as to bend them over, thus providing a more efficient cutting action. The inner end of the guide rod 23 is curved as at 24 toward the forward part of the platform and this curved portion 24 serves to dispose the stalks, so that when cut, they will fall in an approximately parallel position relative to the longitudinal axis of the platform.

Mounted at one end as at 25 upon the end of a laterally extending brace bar 25′ which is secured adjacent the inner edge of the cut away portion 17 and extends outwardly at right angles from the bar 4 and adjacent side of the platform 1, is a forwardly and upwardly inclined supporting bar 26. This bar 26 is disposed horizontally in superposed relation to the cutter blade 16. The outer end of the bar 26 is apertured or recessed so as to permit the fitting of the guide rod 23 therein. Brace rods 27 and 28 are secured to the intermediate portion of the bar 26 and adjacent the ends of the guide rod 23. An upwardly inclined brace rod 29 is secured at its terminals to the end of the cutter blade 16 and the bar 26 thus serving to aid the brace 19 in supporting and reinforcing the blade 16.

The means for preventing cut stalks from interfering with the cutting operation consists of a sprocket chain 30 having a plurality of hook members 31 secured rigidly thereon. This chain is operatively mounted upon a pair of sprocket wheels 32 and 33 and is disposed for operation in a vertical transverse plane upon the platform 1. A transverse slot 34 is formed in the platform 1 and communicates at one end with the cut away portion 17 at a point forwardly of the cutter blade 16. The sprocket wheels 32 and 33 are journaled for rotation within the slot 34 in such a way that the chain 30 with hook members 31 thereon is disposed approximately flush with the upper surface of the platform 1 and so that the hook members 31 are projected above the surface of the platform 1. The sprocket wheel 32 is journaled so that it projects beyond the marginal edge of the cut away portion 17 and is disposed in spaced relation to the cutter blade 16.

The slot 34 is offset as at 35 and continued to a point adjacent the rear edge of the platform. Mounted within the offset portion of the slot 34 is a shaft 37 having a beveled gear 38 keyed upon one end and meshing with a beveled gear 39 carried upon one end of the horizontal shaft 40 that is secured by brackets or bearings 41 to the rear edge of the platform 1. A chain 42 operatively engages the sprocket 43 carried upon the other end of the shaft 40 and with a large sprocket wheel 44 that is carried upon the adjacent wheel 2. The shaft 37 carries the sprocket 33. It will thus be seen that when the device is drawn across a field the chain 30 is operated through the medium of the gearing described.

In operation, when the wagon is drawn across the field so that the row of corn to be cut is disposed upon the side on which the cutting apparatus is mounted, the guide rod engages the stalks and bends them over as the machine advances. The bending of the stalks prior to their engagement with the blade 16 facilitates a reliable and efficient cutting action. The curved portion 24 of the guide bar disposes the corn in a desirable position upon the platform 1 and a person may stand upon the platform so as to dispose the corn that does not fall between the walls 11 and 12 in the proper position. Should the stalks fall adjacent the chain 30 carrying the hook members 31 the hook members immediately engage the stalks and force them upon one side of the cutter and prevent interference of further cutting action. There has been provided a short knife blade 45 that is arranged upon the platform 1 at right angles to the blade 16 and at the inner edge of the portion 17. This knife serves to engage improperly cut stalks and cut them off in the proper manner. By vertically adjusting the axle 3, the cutter blades may be disposed in the desired position.

It will be readily apparent with reference to the foregoing description and accompanying drawings that there has been provided an effectual corn harvester which is capable of being driven between rows of corn for cutting the corn and disposing it upon the platform of the wagon body in a reliable and expeditious manner. The desired cutting operation is insured by means of the sprocket chain 30 carrying hook members 31 thereon.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

What is claimed is:—

1. A corn harvester comprising a platform having ground wheels thereon, cutter blades carried by the platform extending outwardly therefrom obliquely to the line of travel of the harvester, said platform having a transverse slot therein opening on one side adjacent the cutter blades, a chain mounted within the slot and hook members carried upon the chain adapted to engage the stalks and remove them from the cutter blades.

2. A corn harvester comprising a platform having ground wheels thereon, an angularly disposed cutter blade secured to said platform and extending outwardly obliquely to the line of travel of the harvester from one side thereof, said platform having an inclined edge, the inner portion of said cutter blade being disposed adjacent to and having its cutting edge parallel with said inclined edge in spaced relation thereto, and a second cutting blade arranged at right angles to the first blade and disposed at the inner end of the first blade.

3. A corn harvester comprising a wheeled platform, a cutter blade carried by said platform and disposed outwardly therefrom obliquely to the line of travel of the harvester, said platform having a transverse recess therein opening at one end adjacent the cutter blade, a pair of sprocket wheels rotatably journaled within the recess and having their upper terminals disposed approximately flush with the upper surface of the platform, a chain rotatably mounted upon the sprocket wheels, a plurality of hook members fixed on the chain and adapted to be disposed above the upper surface of the platform and means for operatively connecting one of the sprocket wheels with one of the platform wheels.

4. A corn harvester comprising a wheeled platform, a cutter blade secured to said platform and extending outwardly from one edge thereof obliquely to the line of travel of the harvester, a guide bar disposed forwardly of and in superposed relation to the cutter blade, the inner end of said guide bar being disposed above the platform and thereover and curved forwardly toward the front of the platform, means for supporting the guide bar and traveling means operating in a transverse plane relative to the longitudinal axis of the platform for engaging the cut stalks and disposing them to one side of the cutter blade, said means being operatively connected with one of the platform wheels.

In testimony whereof I affix my signature in presence of two witnesses.

ALFRED DAVIDSON.

Witnesses:
H. A. COIL,
A. A. NORMAN.

Copies of this patent may be obtained for five cents each, by addressing the "Commissioner of Patents, Washington, D. C."